(12) United States Patent
Mondello (10) Patent No.: US 9,714,065 B2
(45) Date of Patent: Jul. 25, 2017

(54) MODIFIABLE BICYCLE SYSTEM

(71) Applicant: Edward Mondello, Wilmington, NC (US)

(72) Inventor: Edward Mondello, Wilmington, NC (US)

(*) Notice: Subject to any disclaimer, the term of this patent is extended or adjusted under 35 U.S.C. 154(b) by 0 days.

(21) Appl. No.: 15/192,116

(22) Filed: Jun. 24, 2016

(65) Prior Publication Data

US 2016/0375949 A1  Dec. 29, 2016

Related U.S. Application Data

(60) Provisional application No. 62/185,802, filed on Jun. 29, 2015.

(51) Int. Cl.
| | | |
|---|---|---|
| *B62K 3/02* | (2006.01) | |
| *B62K 13/08* | (2006.01) | |
| *B62K 19/30* | (2006.01) | |
| *B62K 21/12* | (2006.01) | |
| *B62J 25/00* | (2006.01) | |
| *B62K 3/00* | (2006.01) | |

(52) U.S. Cl.
CPC ............ *B62K 13/08* (2013.01); *B62J 25/00* (2013.01); *B62K 3/002* (2013.01); *B62K 19/30* (2013.01); *B62K 21/12* (2013.01)

(58) Field of Classification Search
CPC .......... B62K 13/08; B62K 19/30; B62K 3/02; B62K 21/12; B62K 2700/54; B62K 2700/58
See application file for complete search history.

(56) References Cited

U.S. PATENT DOCUMENTS

| | | | |
|---|---|---|---|
| D614,538 S * | 4/2010 | Rochon ................ | D12/111 |
| 8,602,432 B2 * | 12/2013 | Baron .................. | B62K 13/08 280/200 |
| 2004/0070165 A1* | 4/2004 | Liebetrau ............. | B62K 9/00 280/259 |
| 2014/0076649 A1* | 3/2014 | Kim .................... | B62K 15/008 180/220 |

FOREIGN PATENT DOCUMENTS

| | | |
|---|---|---|
| DE | 202013004092 U1 | 7/2013 |
| FR | 2588818 A1 | 4/1987 |
| GB | 2529603 A * | 3/2016 |
| JP | 11-342885 | 12/1999 |

* cited by examiner

*Primary Examiner* — John Walters
*Assistant Examiner* — James Triggs
(74) *Attorney, Agent, or Firm* — Carla Gannon Law (57) ABSTRACT

A modifiable bicycle includes a frame having a frame mount to which various components with mounting plates can be attached. The bicycle can be modified in a variety of ways by adding and removing components so as to function as a pedaled bike, a balance bike, or a scooter.

15 Claims, 15 Drawing Sheets

MODIFIABLE BICYCLE SYSTEM

CROSS-REFERENCE TO RELATED APPLICATIONS

This application claims priority from the United States provisional patent application entitled MODIFIABLE BICYCLE SYSTEM, which was filed on Jun. 29, 2015, and assigned the Ser. No. 62/185,802.

BACKGROUND OF THE INVENTION

Field

The present invention relates generally to bicycles, and more specifically, to a bicycle system modifiable for use as a balance bike, scooter or pedaled bike.

Related Art

There are a variety of types of bicycles, herein defined as human-powered vehicles having two wheels attached to a frame, one wheel behind the other. One type of bicycle, a "balance bike" also known as a "Laufrad bike", is propelled by the rider's feet striking the ground while the rider sits on a seat. Another type, a "scooter", is propelled by one or the other, or by alternating both of, the rider's feet, typically while the rider is standing. A "pedaled" bike is propelled by the rider's feet exerting force on a mechanism that forces a wheel to turn.

It is difficult for some people to learn to ride a pedaled bicycle. For these people it may be useful to start with a simple bike using gross motor skills and balance, and incrementally transition to a pedaled bicycle which requires finer motor skills and more acute balance. Alternatively, some people simply want to ride different types of bikes depending on factors such as terrain, desired workout, and mood. Thus, it is desirable to have a single bicycle system that is modifiable for use as a Laufrad bike, scooter and pedaled bike. It is desirable that this modifiable bicycle is easy to modify, and easy to use.

SUMMARY OF THE INVENTION

A modifiable bicycle includes a frame that supports two wheels aligned one behind the other, a handlebar that can be raised and lowered, and a seat that can be removed. The bottom side of the frame includes a frame mount to which various components with mounting plates can be attached. The bottom side of the frame can include a couple of downward protrusions that can be used individually or together as a connection point for components. The bicycle can be modified in a variety of ways by adding and removing components so as to function as a pedaled bike, a balance bike, or a scooter.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:

10—bicycle system;
10*a*—pedaled bike;
10*b*—balance bike;
10*c*—scooter;
25—frame mount;
30—pedal mount plate;
35—peg mount plate;
37—blade;
38—tapered edge;
40—bolt;
50—apertures;
60—frame;
64—alternative peg mount plate;
65—lower front frame tube;
66—lower rear frame tube;
70—pedal assembly;
80—foot rest assembly;
82—peg rest;
90—foot board deck assembly;
92—post mount;
93—post mount support;
95—strap;
96—buckle;
100—male neck extension;
105—female neck extension;
106—projection;
107—groove;
109—front wheel; and
110—clamp.

Broadly, the bicycle system of the present invention includes a bicycle that has an elongated frame mount attached to, and protruding from, the frame. This elongated mount is the attachment point for a pedal assembly or for a foot rest assembly, depending on whether the bike is to be configured as a pedaled bike or a scooter. Alternatively, if nothing is attached to the elongated mount, the bicycle can be used as a balance bike.

Figure 1:
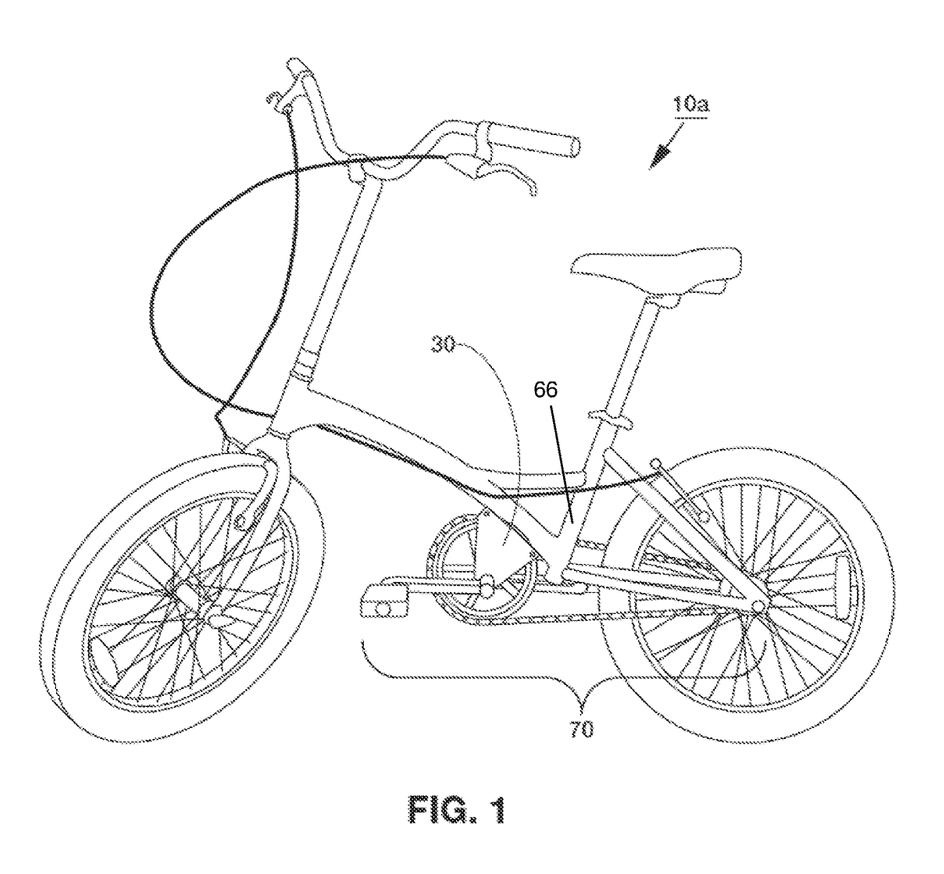
FIG. 1 is an embodiment of the modifiable bicycle system configured as a pedaled bike.
Figure 2:
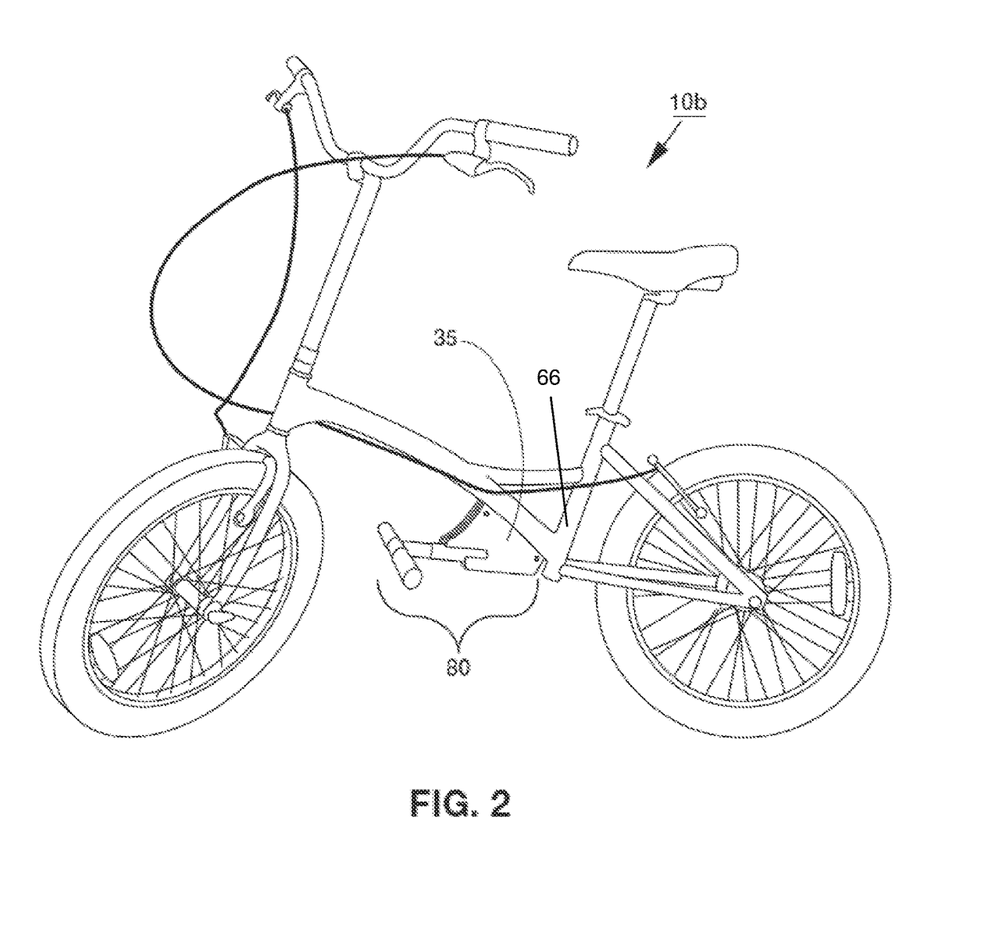
FIG. 2 is an embodiment of the modifiable bicycle system configured as a balance bike.
Figure 15:
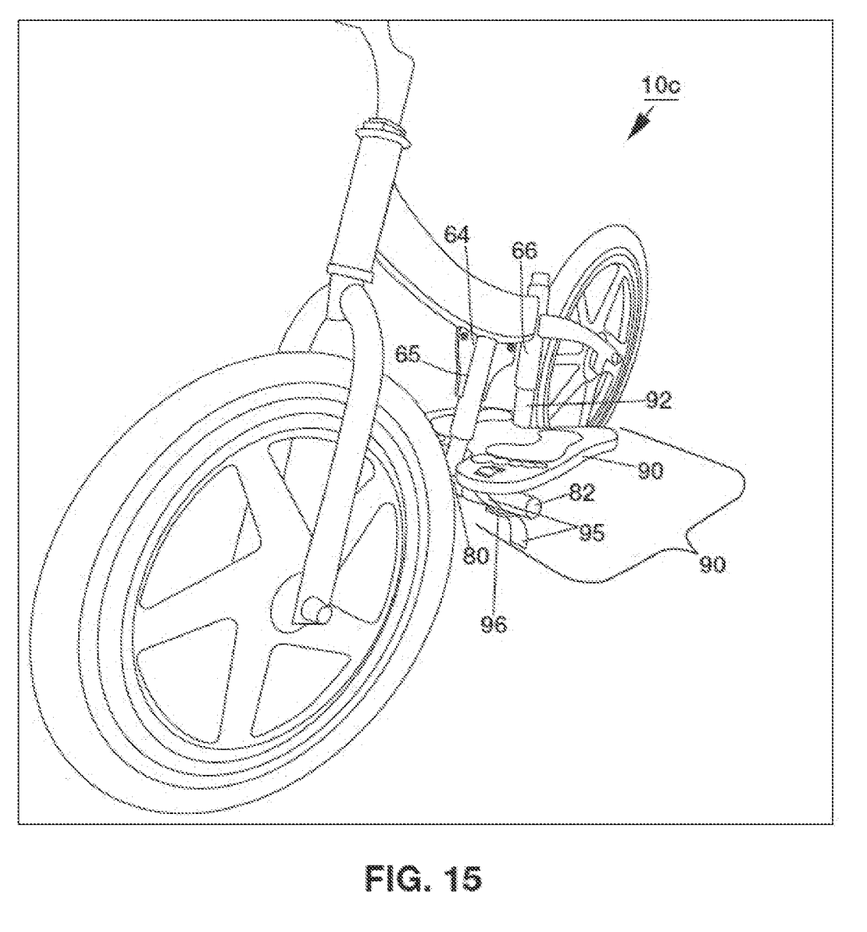
FIG. 15 is an embodiment of the modifiable bicycle system configured as a scooter.

Bicycle system of the present invention, generally referred to herein as 10, can be configured to be pedaled bike 10a (FIG. 1), balance bike 10b (FIG. 2), or scooter 10c (FIG. 15). The various bike configurations are achieved by employing specific components, for example pedal assembly 70, foot rest assembly 80, or foot board deck assembly 90, respectively.

Figure 3:
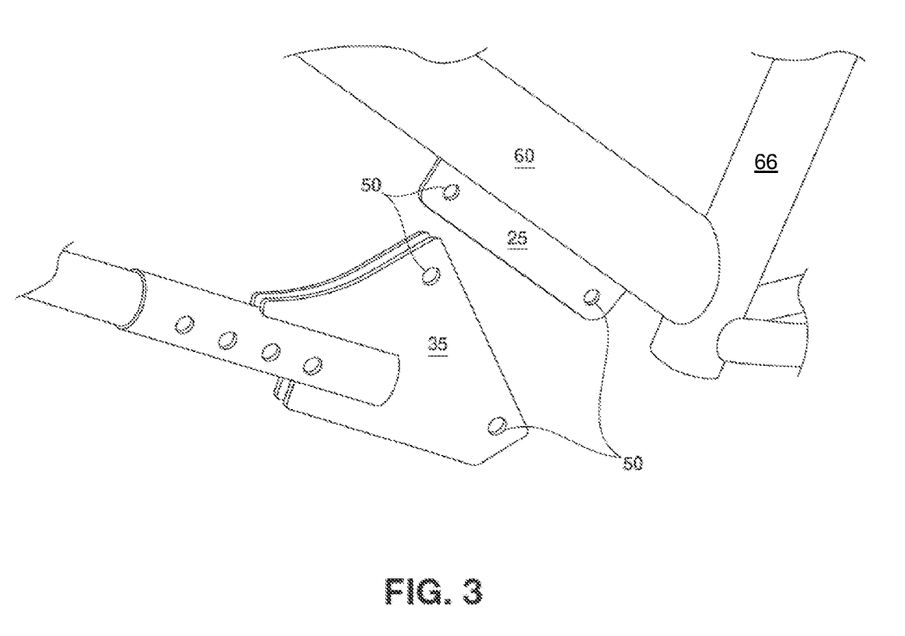
FIG. 3 depicts the peg mount plate and frame aligned for attachment.

Referring to FIG. 3, frame 60 includes elongated frame mount 25 which protrudes downwardly from frame and is longitudinally parallel to the frame. Frame mount 25 includes a means for attaching a plate, here shown as apertures 50.

Figure 4:
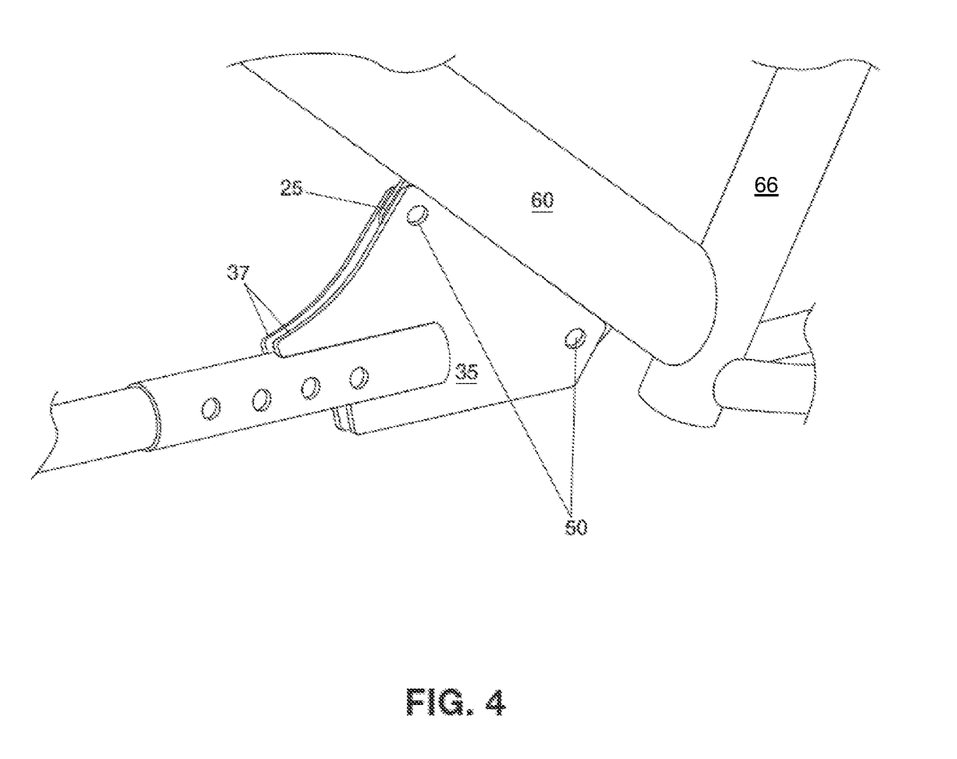
FIG. 4 depicts the peg mount plate in position on the frame mount, but unattached to the bicycle frame.
Figure 5:
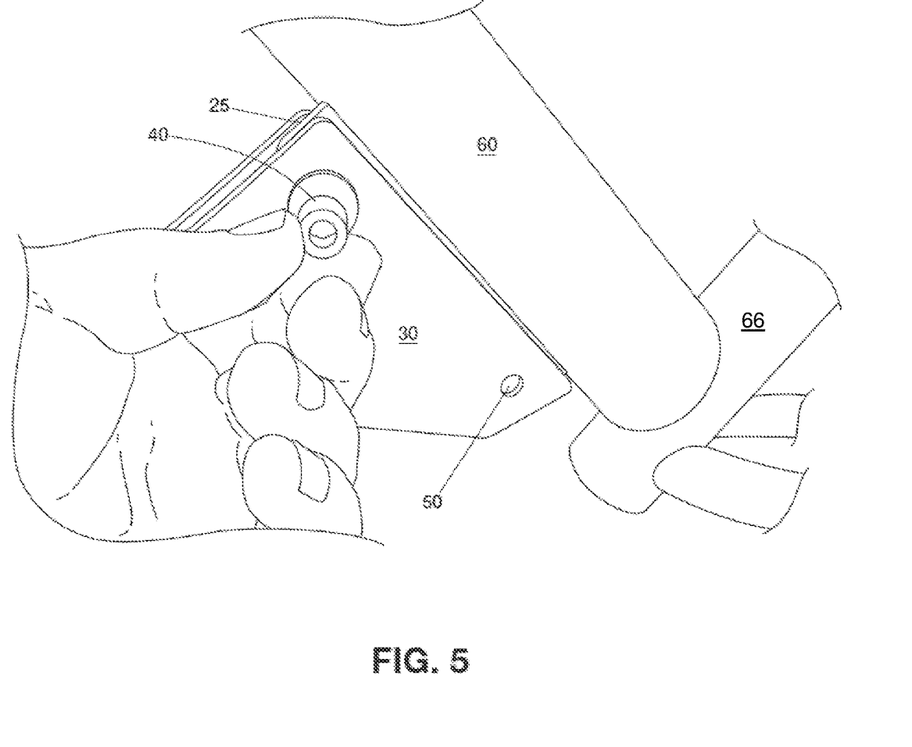
FIG. 5 depicts the pedal mount plate in position, and being attached to the bicycle frame with a bolt.
Figure 6:
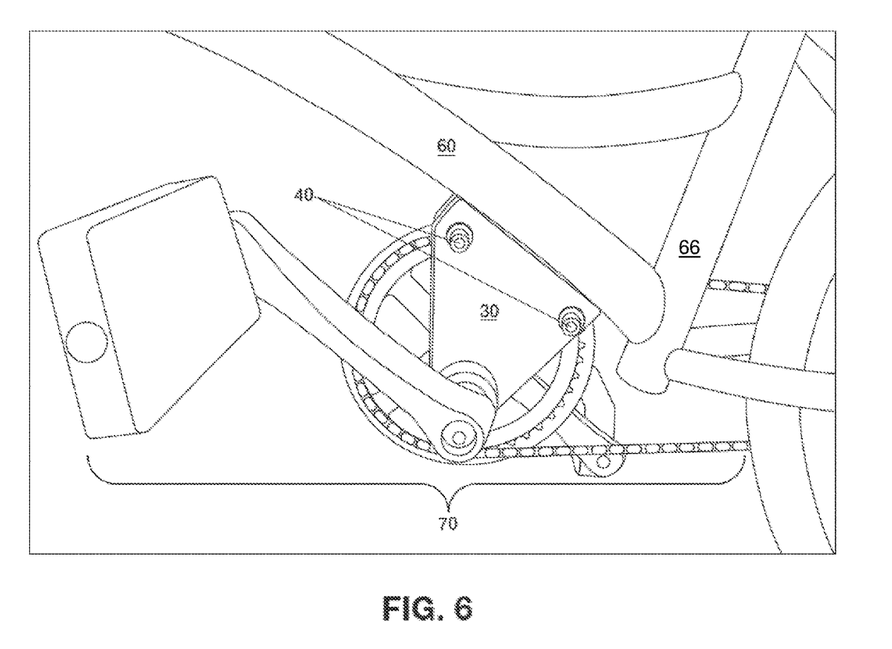
FIG. 6 depicts the pedal assembly attached to the bicycle ame.

Frame mount plate 25 serves as a connection site for a variety of component assemblies. By way of example, pedaled bike 10a has a pedal assembly 70 which includes a sprocket, chain and pedals, plus pedal mount plate 30 which releasably engages with frame mount 25. Similarly, balance bike 10b includes foot rest assembly 80 having peg rests 82 and peg mount plate 35. For simplicity FIGS. 3-5 show peg mount plate 35, but it should be understood that pedal mount plate 30 could likewise be used.

Figure 8:
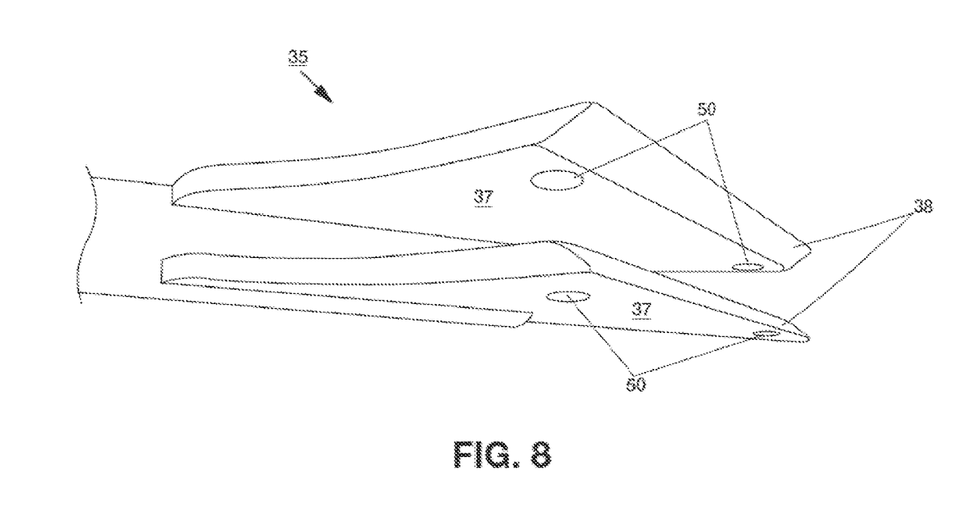
FIG. 8 is a close-up perspective view of the peg mount plate.

Referring to FIG. 8, peg mount plate 35 preferably includes two substantially parallel blades 37 with a space there between. As shown in FIG. 4, frame mount 25 fits between blades 37 of peg mount plate 35, with apertures 50 aligned. FIG. 5 depicts securing pedal mount plate 30 to frame mount 25 through aligned apertures 50 using bolt 40. As stated earlier, pedal mount plate 30 and peg mount plate 35 are similarly attached, and interchangeable.

Upon attachment of pedal mount plate 30 the chain must be connected to the sprocket of the rear wheel, in order to achieve pedal driven propulsion of the bike.

Figure 7:
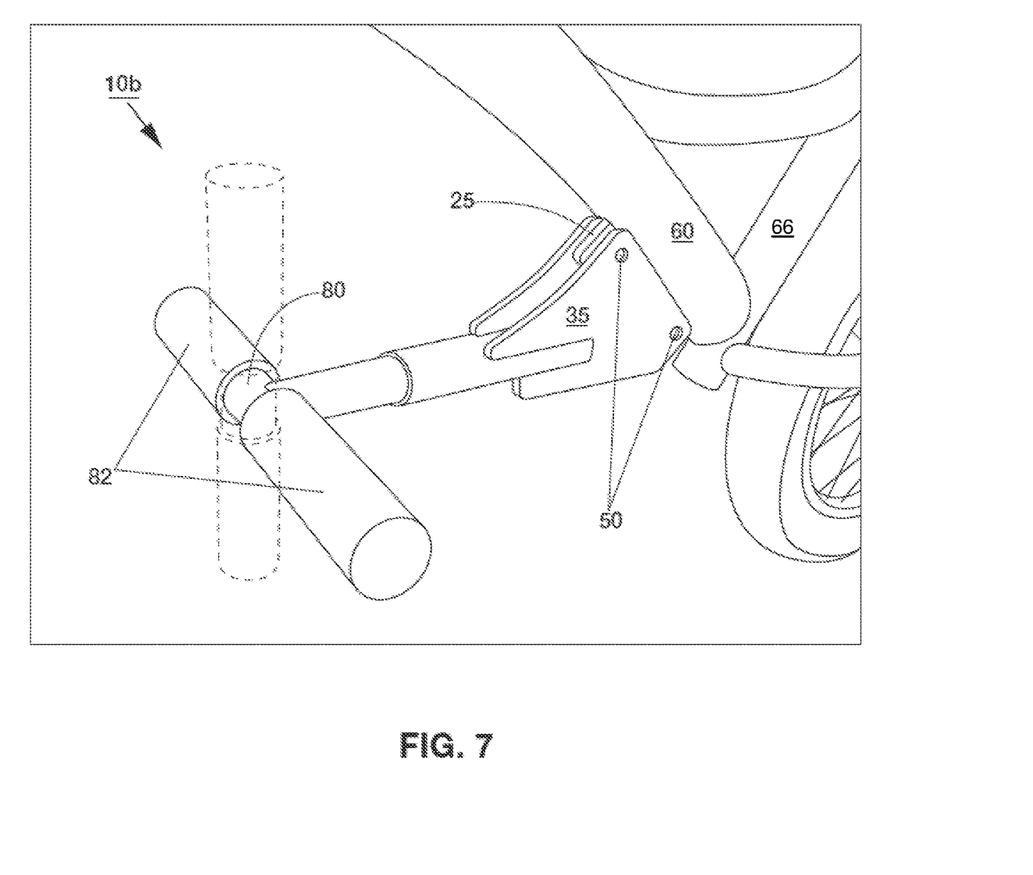
FIG. 7 depicts the foot rest assembly and peg mount plate in position, but unattached to the frame mount on the bicycle frame.

Referring to FIG. 7, foot rest assembly 80 is rotatable such that peg rest 82 can be oriented horizontally as shown, vertically, as shown in phantom, or in any position there between. In this manner a rider may use balance bike 10b in a manner where they can rest one or both feet on peg rest 82, or the rider can rotate peg rest 82 vertically so they have full range of motion during propulsion without the risk of inadvertently coming in contact with peg rest 82.

As shown in FIG. 8, each blade 37 preferably includes tapered edge 38, which helps guide peg mount plate 35 (or pedal mount plate 30) into position surrounding frame mount 25.

Figure 9:
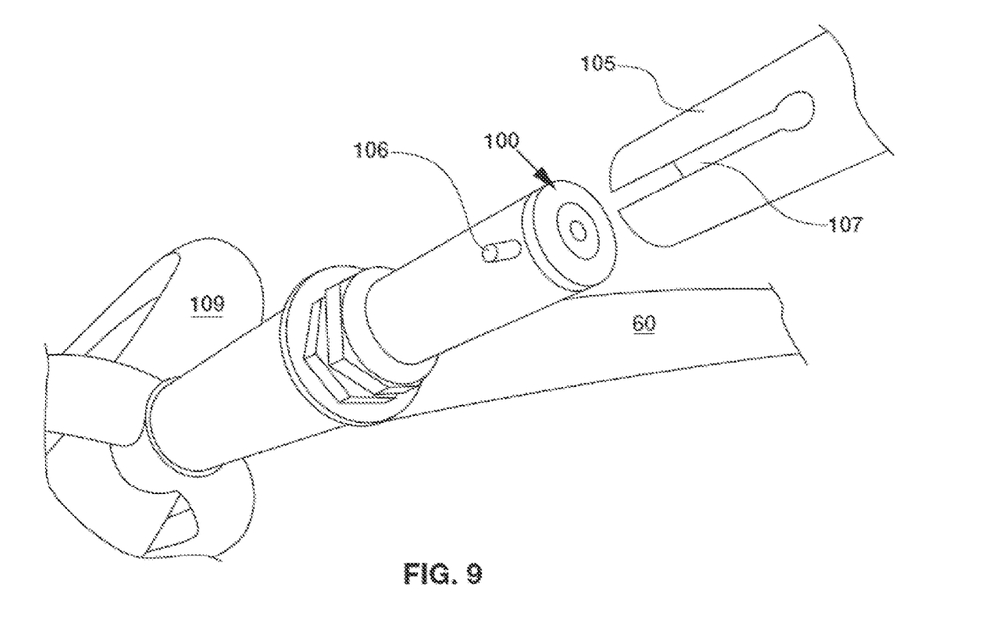
FIG. 9 depicts the bicycle frame with the male neck extension and associated peg aligned for engagement with the female neck extension and associated groove.
Figure 10:
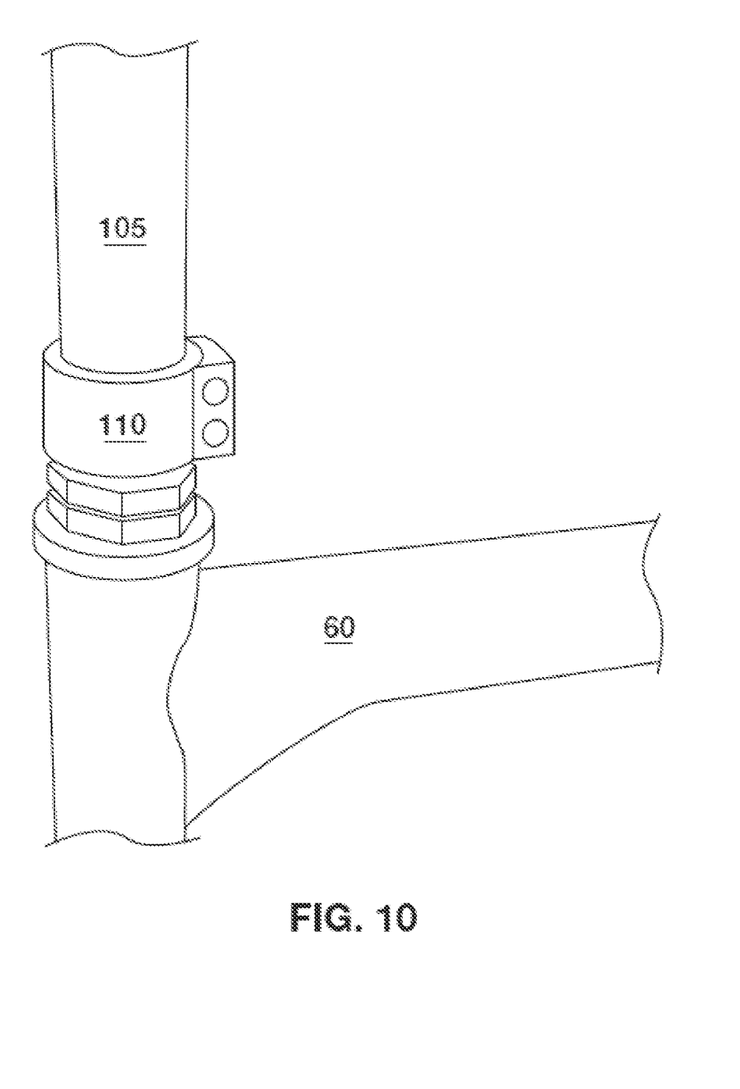
FIG. 10 depicts the engaged neck extension of FIG. 9, secured in place by a clamp.

It is preferable for bicycle system 10 to employ a relatively tall handlebar system so the rider is comfortable regardless of the configuration as a pedaled, bike, balance bike, or scooter. As shown in FIG. 9, elongated handlebar is preferably achieved using male neck extension 100 that engages with frame 60, and female neck extension 105 that engages with male neck extension 100. Undesirable free rotation of female neck extension 105 relative to male neck extension 100 is achieved by engagement of projection 106 within groove 107. As shown in FIG. 10. Clamp 110 secures female neck extension 105 over male neck extension plug 100 (not shown). In this manner handlebars, female neck extension 105, male neck extension 100 and front wheel 109 all rotate as one unit. The handlebar stem is preferably approximately 28 to 32 inches high from the ground to the center of the handle bar.

Figure 11:
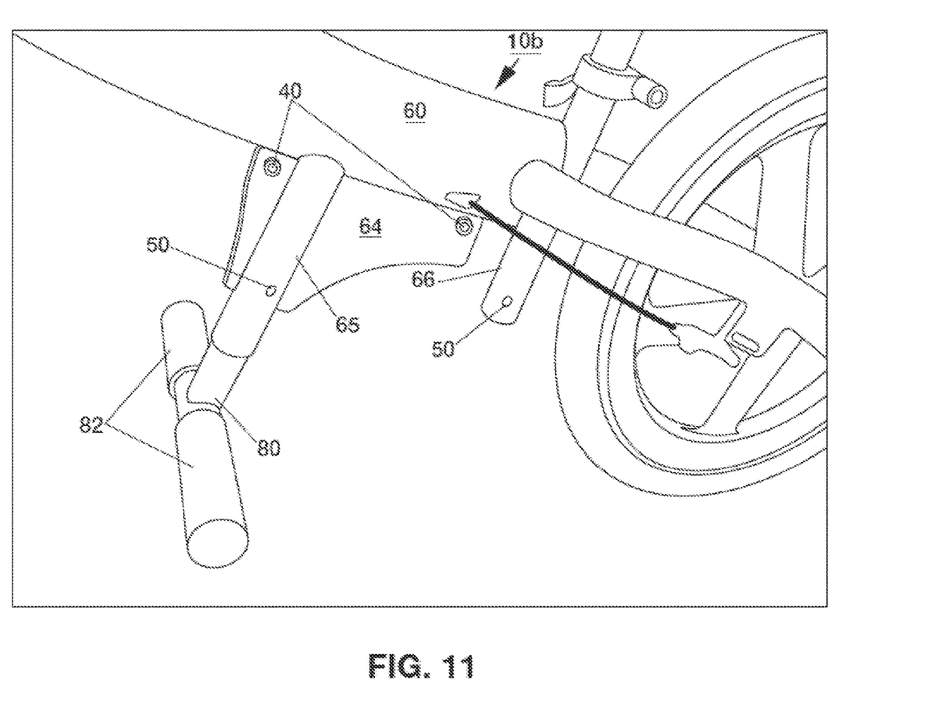
FIG. 11 depicts a bicycle system having the foot rest assembly attached to the bicycle frame.

Referring to FIG. 11, in an alternative embodiment, frame 60 has protruding lower front frame tube 65 and lower rear frame tube 66. Lower rear frame tube 66 is preferably permanently attached to frame, for example by welding, however these structures are not necessarily present in lieu of frame mount 25. As shown in FIG. 11, foot rest assembly 80 is engaged with lower front frame tube 65. Lower front frame tube is engaged with frame 60 at alternative peg mount plate 64. In this manner the bicycle system can be used as a balance bike.

Figure 12:
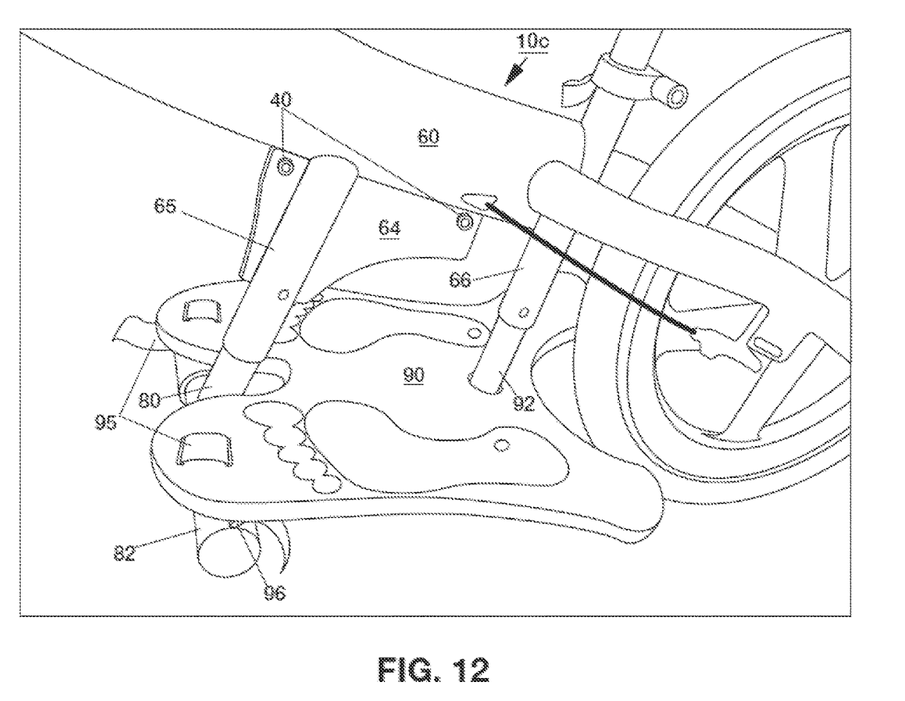
FIG. 12 depicts a bicycle system having the foot board deck assembly attached to the bicycle frame and supported by a foot rest assembly mounted to the lower front frame tube.
Figure 13:
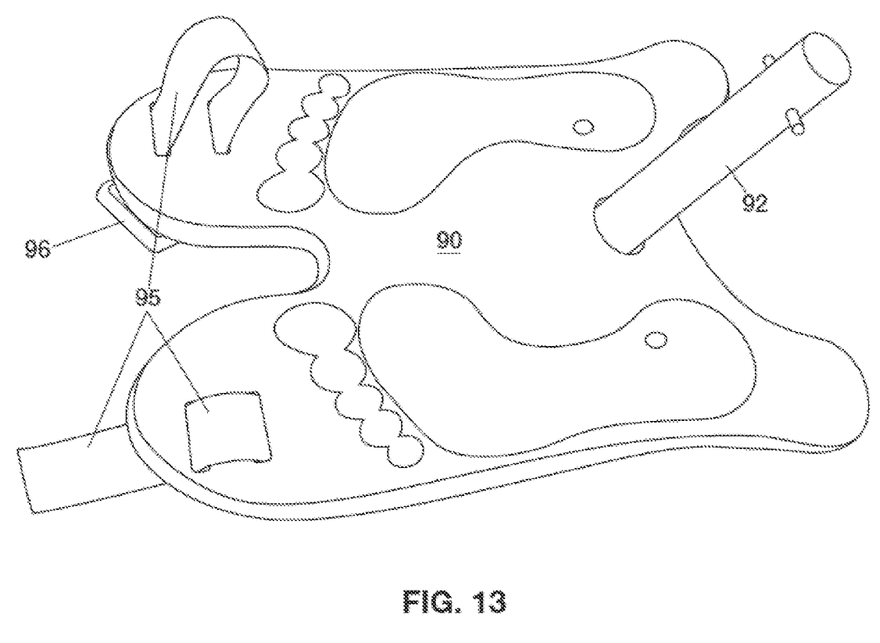
FIG. 13 depicts the top side of the foot board deck assembly with the post mount, straps and buckle.
Figure 14:
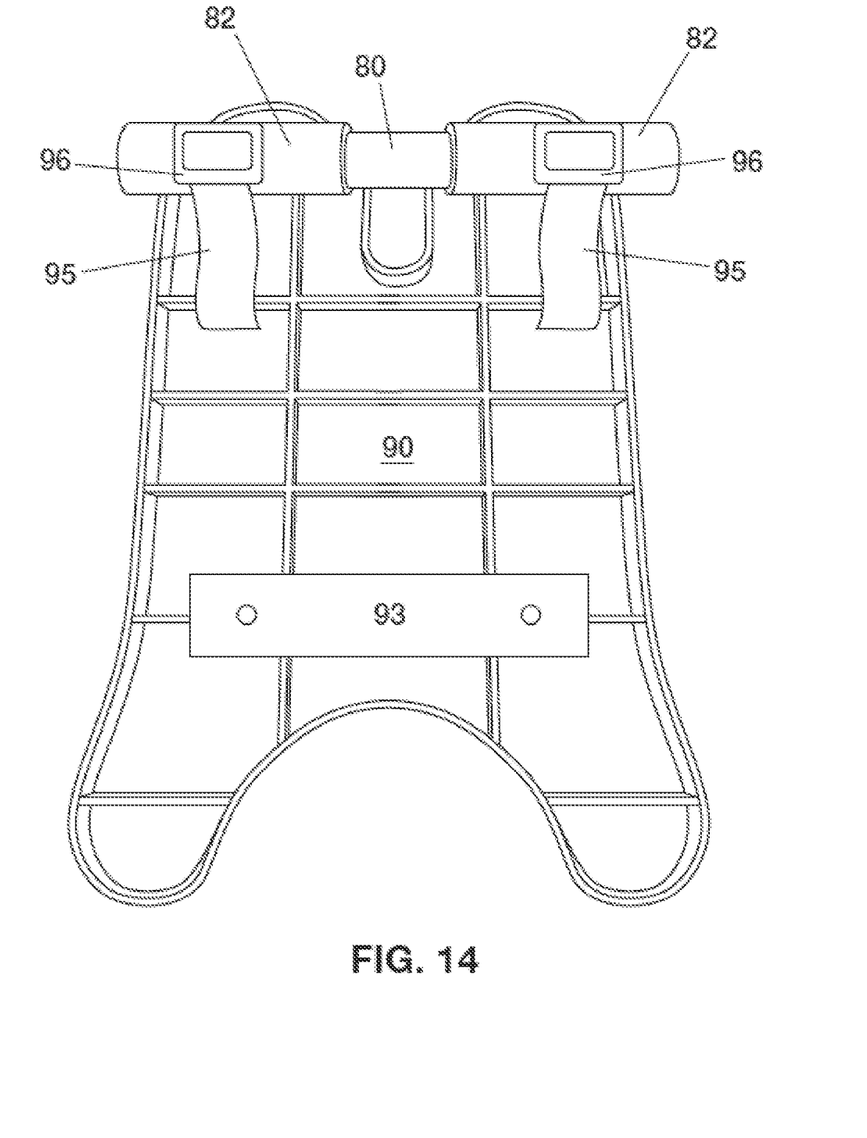
FIG. 14 depicts the bottom side of the foot board deck assembly with the straps, buckles and post mount abutment.

As shown in FIG. 12, the bicycle system can be used as a scooter by engaging post mount 92 of foot board deck assembly 90 with lower rear frame tube 66, and resting front end of foot board deck assembly 90 on top of peg rests 82. Foot board deck assembly 90 is secured to peg rest 82 using straps 95 that are secured by buckles 96, as best shown in FIGS. 13 and 14. Referring to FIG. 14, post mount support 93 provides an abutment to post mount 92 (FIG. 13). As shown in FIG. 15, scooter 10c is normally operated without a seat.

Frame mount 25 and lower rear frame tube 66 are preferably constructed of steel, but other materials such as alloy or carbon fiber could also be used. The majority of the structures of the bicycle system are preferably constructed of steel, but other materials such as alloys could also be used. Such structures include: pedal mount plate 30; peg mount plate 35; blade 37; lower front frame tube 65; lower rear frame tube 66; peg rest 82; post mount 92; post mount support 93; buckle 96; male neck 100; female neck extension 105; projection 106; and clamp 110. Foot board deck assembly 90 is preferably constructed of plastic, but other materials such as wood or allow could also be used. Strap 95 is preferably constructed of nylon, but other materials such as leather could also be used.

In use, a user of bicycle system 10 selects a desired bicycle configuration from pedaled bike 10a, balance bike 1013, or scooter 10c. They then attach the corresponding component, pedal assembly 70, foot rest assembly 80, or foot board deck assembly 90, respectively. In the case of pedal assembly 70 and foot rest assembly 80, attachment is achieved by connecting pedal mount plate 30 or peg mount plate 35 to frame mount 25. In the case of pedaled bike 10a, the chain of pedal assembly 70 is attached to the back wheel. In the case of scooter 10c, foot board deck assembly 90 is engaged with lower front frame tube 65 and lower rear frame tube 66, with front end of foot board deck assembly 90 preferably resting on peg rests 82. In the case of scooter 10c the bicycle seat is removed. The user then may operate the bicycle in the desired configuration.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Rather, it should be understood that the foregoing relates to exemplary embodiments of the invention and that modifications may be made without departing from the spirit and scope of the invention as set forth in the following claims. It should also be understood that ranges of values set forth inherently include those values, as well as all increments between. "Approximately" and the like shall mean +/−10% unless otherwise stated or nonsensical. It should also be understood that terms such as "substantially" and the like mean generally considered to be true, but allowing for slight variations. For example "substantially planar" allows for surface imperfections and "substantially permanently attached" means separable but probably resulting in damage.

What is claimed is:

1. A modifiable bicycle system including:
   A) A bicycle frame;
   B) A lower rear frame tube attached to said bicycle frame;
   C) A frame mount substantially permanently attached only to said bicycle frame, said frame mount including an elongated ridge defining a plurality of apertures solely linearly aligned; and
   D) A mount plate releasably attached to said frame mount, said mount plate including double blades, wherein said frame mount is separate from said lower rear frame tube.

2. The modifiable bicycle system of claim 1 wherein said mount plate sandwiches said elongated ridge between said double blades.

3. The modifiable bicycle system of claim 1 wherein said double blades are substantially parallel.

4. The modifiable bicycle system of claim 3 wherein said double blades define tapered edges.

5. The modifiable bicycle system of claim 1 further comprising at least one component connected to said mount plate, said at least one component selected from the group consisting of a sprocket, a pedal, and a chain.

6. The modifiable bicycle system of claim 1 further comprising a peg rest connected to said mount plate.

7. A transportation device including:
   A) A frame;
   B) Two wheels spanned by said frame;
   C) Handlebars connected to the front end of said frame;
   D) A lower rear frame tube attached to said bicycle frame; and
   E) A frame mount including an elongated ridge longitudinally aligned and parallel with said frame, said frame mount defining a plurality of apertures solely linearly aligned, said frame mount substantially permanently attached only to the underside of the back end of said frame for releasably engaging at least one component, wherein said transportation device is capable of functioning as a pedaled bike, a balance bike, or as a scooter, and wherein said frame mount is separate from said lower rear frame tube.

8. The transportation device of claim 7 wherein said at least one component is selected from the group consisting of a pedal, a sprocket, a chain, a peg rest, and a foot board.

9. The transportation device of claim 7 wherein said handlebars are approximately 28 to 32 inches above the ground.

10. A method of modifying a bicycle including the steps of:
    A) Selecting one configuration from the group consisting of a pedaled bike, a balance bike, and a scooter; and
    B) Attaching a component to the underside of the frame of a modifiable bicycle by reversibly engaging a mount plate of the component to an elongated ridge of a frame mount of the frame, wherein the longitudinal axis of said elongated ridge is substantially parallel to said frame, and wherein said frame mount is engaged only with one portion of said frame, and said frame mount is separate from said lower rear frame tube.

11. The method of claim 10 wherein said step of attaching a component to the underside of the frame of a modifiable bicycle includes the step of aligning apertures of said mount plate with a plurality of apertures of said frame mount, wherein said apertures of said frame mount are solely linearly aligned.

12. The method of claim 10 wherein said step of attaching a component to the underside of the frame includes the step of attaching a pedal assembly to the underside of the frame.

13. The method of claim 12 wherein said step of attaching a pedal assembly to the underside of the frame further comprises the step of attaching a chain to a back wheel.

14. The method of claim 10 wherein said step of attaching a component to the underside of the frame includes the step of attaching a foot rest assembly to the underside of the frame.

15. The method of claim 14 wherein the step of attaching a foot rest assembly to the underside of the frame further comprises the step of rotating a peg rest within said foot rest assembly.

* * * * *